Figure 1:
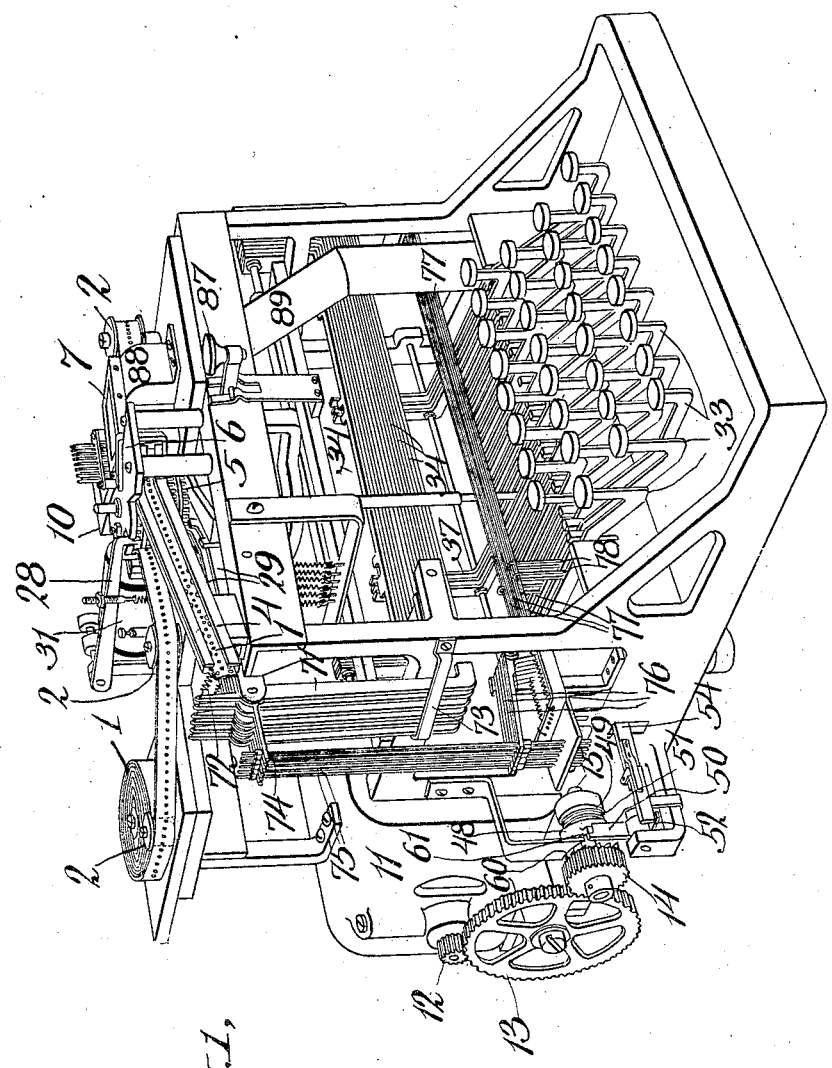

No. 877,821.

PATENTED JAN. 28, 1908.

J. C. BARCLAY.
PERFORATING MACHINE.
APPLICATION FILED MAY 2, 1906.

7 SHEETS—SHEET 1.

WITNESSES:
J. Wares Bryce
Harry T. Goss.

INVENTOR
John C. Barclay
BY
H. M. Marble
ATTORNEY

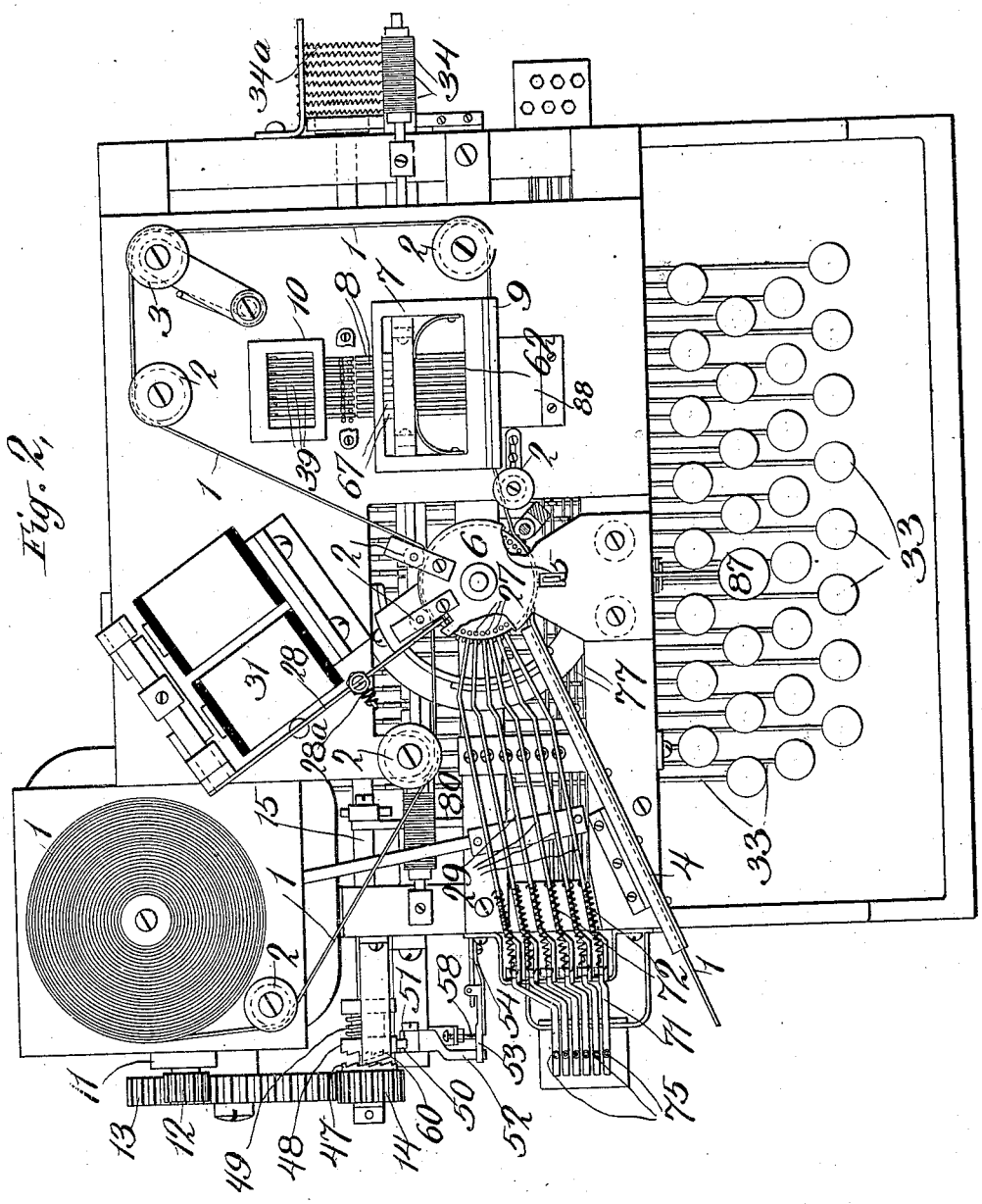

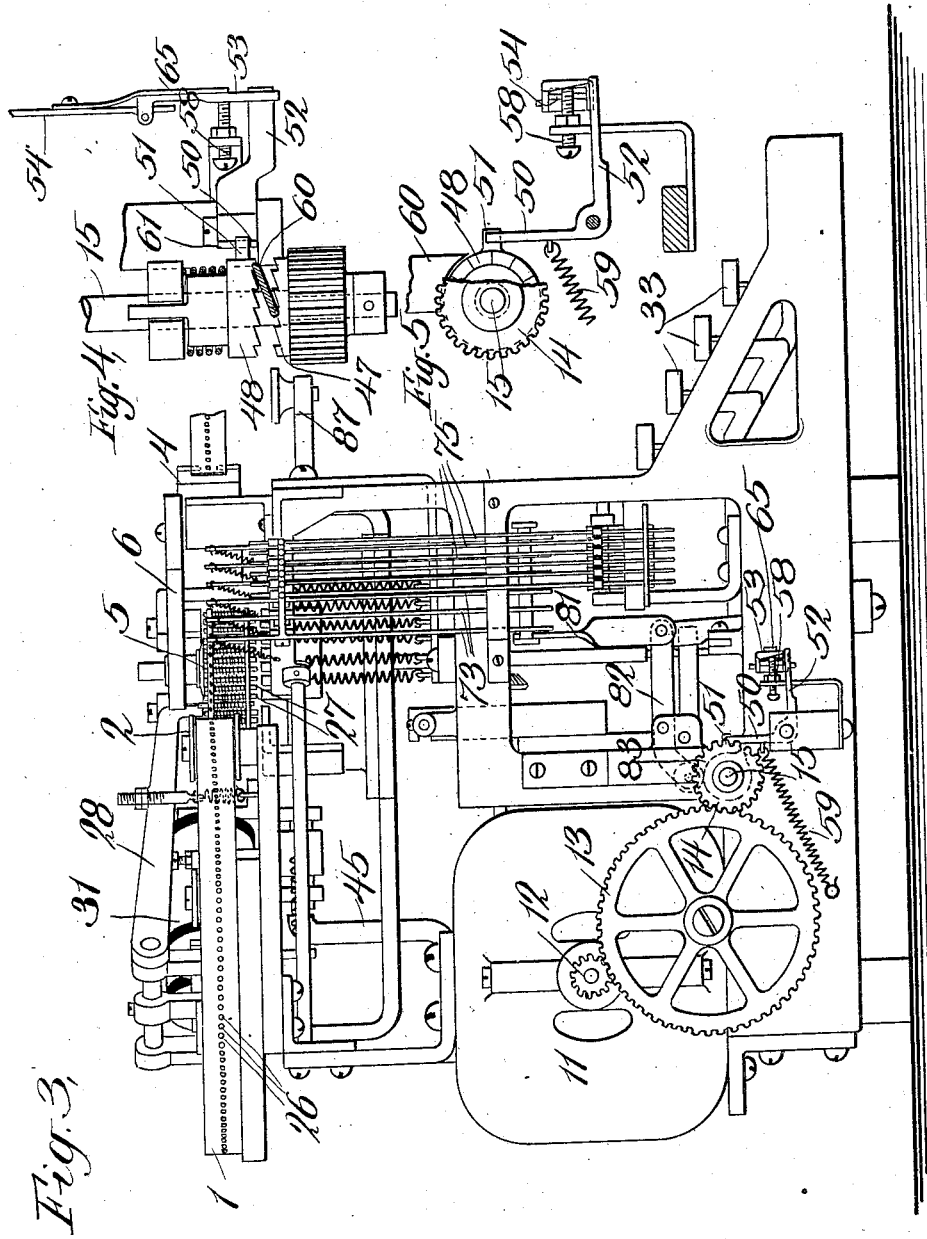

No. 877,821.
PATENTED JAN. 28, 1908.
J. C. BARCLAY.
PERFORATING MACHINE.
APPLICATION FILED MAY 2, 1906.
7 SHEETS—SHEET 4.
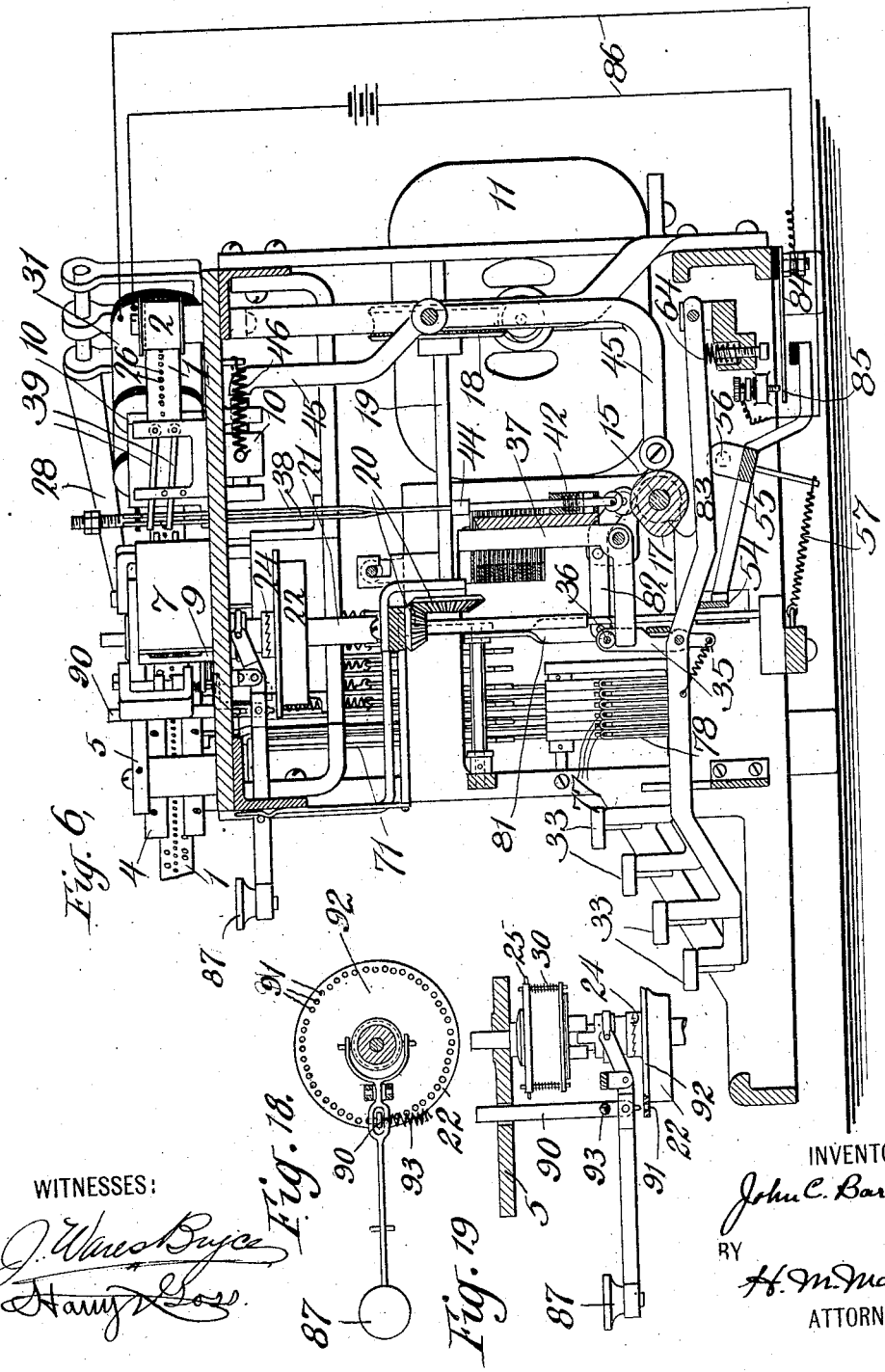
WITNESSES:
INVENTOR
John C. Barclay
BY
H. M. Marble
ATTORNEY No. 877,821.
PATENTED JAN. 28, 1908.
J. C. BARCLAY.
PERFORATING MACHINE.
APPLICATION FILED MAY 2, 1906.
7 SHEETS—SHEET 5.
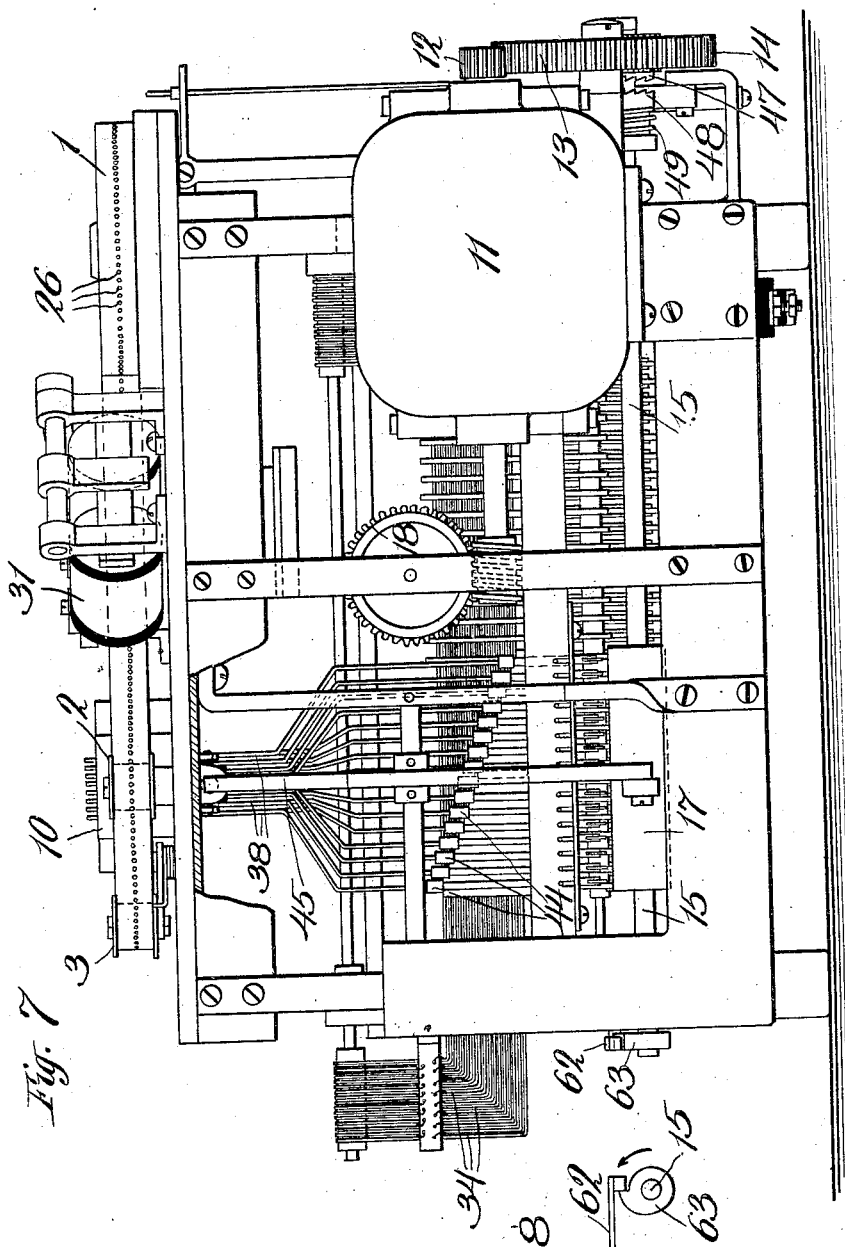
WITNESSES:
INVENTOR
John C. Barclay
BY
ATTORNEY No. 877,821.
PATENTED JAN. 28, 1908.
J. C. BARCLAY.
PERFORATING MACHINE.
APPLICATION FILED MAY 2, 1906.
7 SHEETS—SHEET 6.
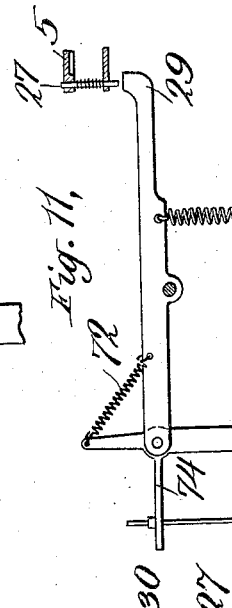
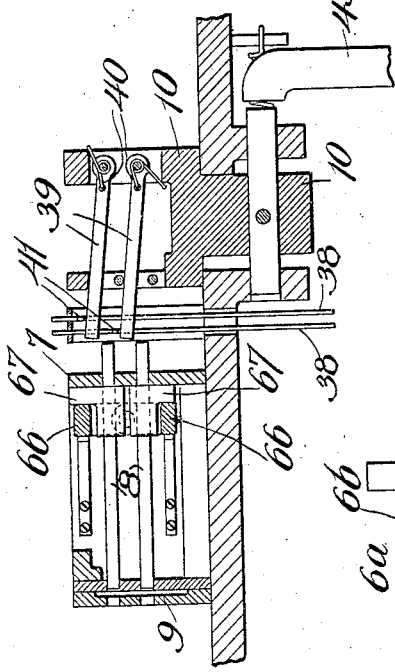
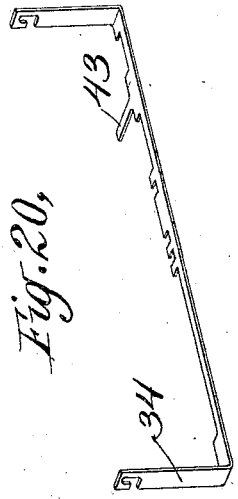
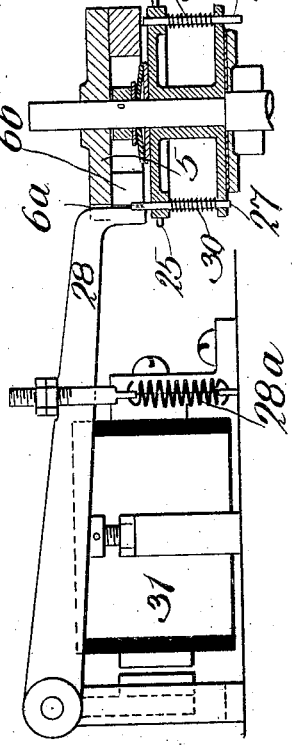
WITNESSES:
INVENTOR
John C. Barclay
BY
H. M. Marble
ATTORNEY

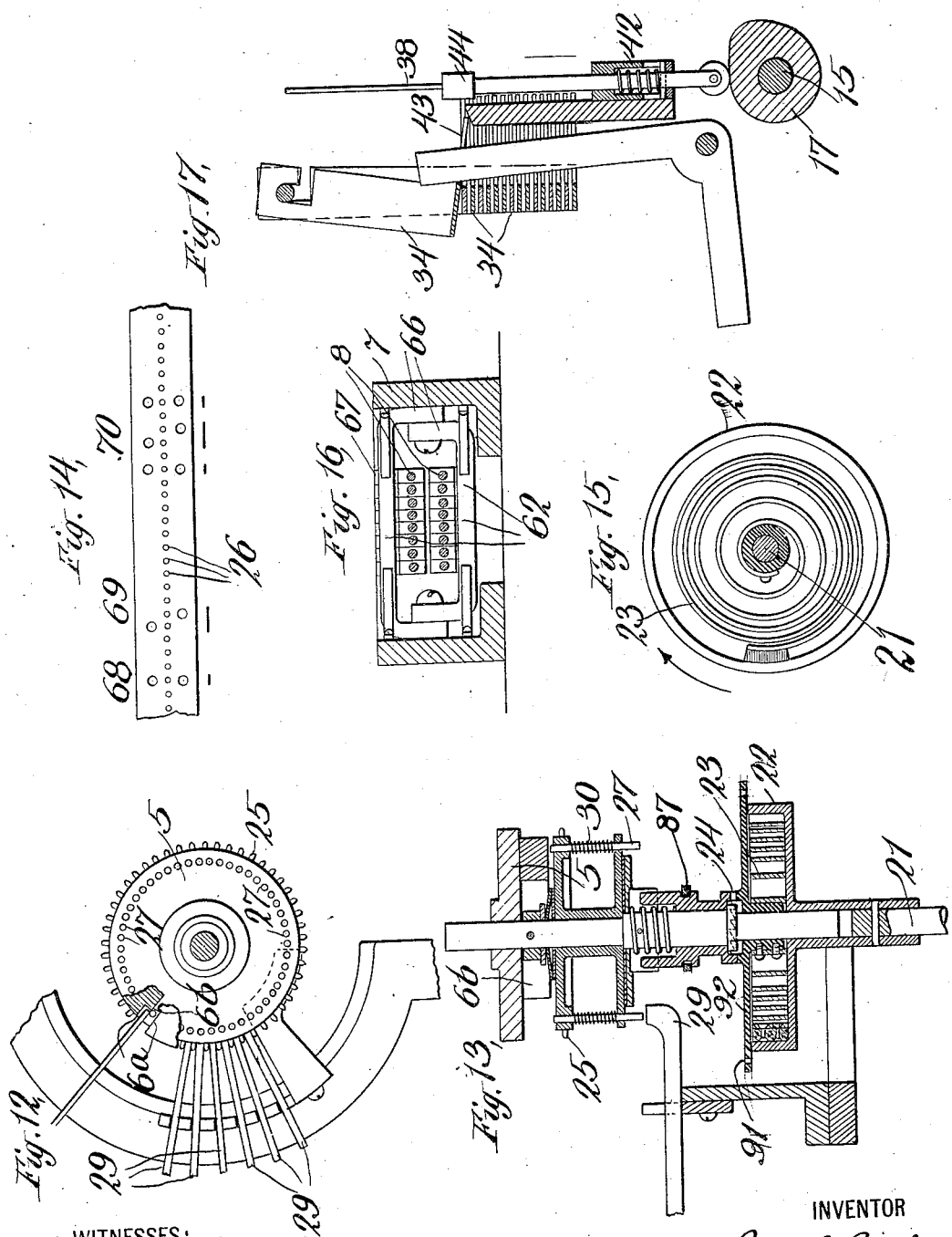

UNITED STATES PATENT OFFICE.

JOHN C. BARCLAY, OF NEW YORK, N. Y.

PERFORATING-MACHINE.

No. 877,821.

Specification of Letters Patent.

Patented Jan. 28, 1908.

Application filed May 2, 1906. Serial No. 314,764.

*To all whom it may concern:*

Be it known that I, JOHN C. BARCLAY, a citizen of the United States, residing at New York, in the county of New York and State of New York, have invented certain new and useful Improvements in Perforating-Machines; and I do hereby declare the following to be a full, clear, and exact description of the same, such as will enable others skilled in the art to which it appertains to make and use the same.

My invention relates to improvements in perforating machines, and more particularly to machines of the class employed for perforating or otherwise marking paper strips or ribbons, such for example as those used in the Wheatstone automatic telegraph system and various other automatic and printing telegraph systems; my invention is not limited in its application to the perforating of telegraph strips and I may use it for any purpose for which marking or perforating machines or mechanism such as described are adapted.

The perforating machine herein illustrated and described is a keyboard machine, having character keys and levers arranged as in typewriting machines.

The objects of my invention are to improve and simplify marking and perforating machines, and particularly keyboard-operated perforating machines such as employed in telegraph systems; to make the same more rapid in action, to improve the "touch" and general working qualities of such machines, so that they may be operated without excessive labor on the part of the operator, even at a high speed; to improve and simplify the marking or punching mechanism, selecting mechanism, and paper-feed mechanism and other sub-mechanisms of machines of this class; and to make the machine compact, relatively simple, relatively inexpensive and comparatively noiseless in operation.

The machine illustrated in the accompanying drawings is adapted for perforating paper strips or ribbons for use in Wheatstone and similar automatic telegraph systems, and may punch said strips according to any desired code, the selecting mechanism being arranged to cause the strip to be fed the proper distance, and to cause the proper arrangement of holes to be punched, for each particular character of the code selected. The mechanism of this machine comprises (a) punching mechanism; (b) paper feed mechanism; (c) selecting mechanism operated by finger keys and controlling appropriate devices of the punching and paper feed mechanisms, by which at each operation of a finger key, the proper combination is "set up" to punch this character in the strip, and space determining means are operated to regulate the feeding of the paper strip; (d) power mechanism, independent of but controlled by the keys, whereby the actual work of feeding the paper and of punching is performed by a motor, preferably a continuously running motor.

I will now proceed to describe my invention with reference to the accompanying drawings in which one form of perforating machine embodying my invention is illustrated, and will then point out the novel features in claims.

In the said drawings: Figure 1 shows a perspective elevation of the machine; Fig. 2 shows a top view thereof; Fig. 3 shows an elevation of the left hand side thereof; Figs. 4 and 5 show detail views of the driving clutch, Fig. 4 being a top view of such clutch and associated parts, and Fig. 5 an end view, gear 14 and one of the clutch members being broken away; Fig. 6 shows a vertical section of the machine from front to rear, the section being taken near the right side of the machine, looking to the left side thereof; Fig. 7 shows a rear elevation of the machine, and in particular shows the various selecting devices and the cam by which the punches are driven and the punch controlling rods 38 reset; Fig. 8 is a detail view of the rebound-catch on shaft 15; Fig. 9 shows a detail central vertical section of the punching mechanism; Fig. 10 shows a detail elevation and partial section of the paper feed mechanism, illustrating particularly the means by which the paper is fed a variable distance according to the particular finger key depressed; Fig. 11 is a diagrammatic view illustrating the means whereby the various tumblers or stops of the paper feed wheel are set up; Fig. 12 shows a top view of the paper feed wheel and associated parts; Fig. 13 shows a central vertical section of the same parts; Fig. 14 shows a portion of the paper strip upon which this machine operates; Fig. 15 shows a top view of the frictional driving mechanism of the paper feed mechanism, the top of the spring casing having been removed;

Fig. 16 shows a detail elevation and partial section of the punching mechanism, the front plate thereof having been removed to expose the punches to view; Fig. 17 is a detail diagrammatic view showing the finger-key-controlled mechanism whereby the various punches required for each particular character are selected and set up; Figs. 18 and 19 are detail views of the key for opening the clutch of the paper feed; and Fig. 20 is a detail view of one of the selecting bails.

For the sake of clearness in illustration I have omitted in Fig. 1 certain of the parts, which if shown would appear in the extreme background. Likewise in said figure I have shown only a few of the bell-cranks 37 and wires 78.

Referring now to the said drawings, 1 designates the paper to be perforated, shown as drawn from a rotatable roll; 2, 2, 2 are guide rolls, 3 a spring-actuated tension roll and 4 a guide-chute through which the paper passes from the machine.

5 designates a paper feed wheel, shown in detail in Figs. 9, 11 and 12, and 6 designates a frame plate immediately above said wheel, said plate partially broken away in Fig. 2 to show the wheel 5 beneath.

7 (Figs. 2, 9 and 16) designates a punch-frame in which are mounted a series of punches 8; and 9 designates a front plate for this punching frame (said front plate removed in Fig. 16) between which front plate and the punch-frame 7 the strip of paper passes.

10 designates a vibrating plate carrying actuating pins corresponding to and by which the punches 8 are operated; said vibrating frame 10 being operated by the main cam mechanism hereinafter described.

11 (Figs. 2 and 3) designates the driving motor of the machine, 12, 13 and 14 gears by which the power of said motor is transmitted to cam shaft 15 (Figs. 3 and 6) said shaft having on it a cam 17 (Figs. 6 and 7) by which the actuating pins for the punches are "set up" to punch the character selected, and by which the frame 10 (Fig. 2) of the punch mechanism is caused to vibrate. Motor 11 also drives, through worm gearing 18 (Figs. 6 and 7) a counter shaft 19 and, through gearing 20, a vertical shaft 21 carrying the paper feed wheel 5 (Figs. 2, 10, 12 and 13) and arranged to drive the same through a friction drive comprising a wheel 22 and spring 23 (Figs. 6 and 13), the former forming a spring-case. A clutch 24 prevents movement of the feed wheel in case of accidental backward movement of shafts 15 and 21.

Paper feed wheel 5 has on its periphery points 25 forming sprocket-teeth coacting with a central row of perforations 26 of the paper strip 1 (Fig. 14). Said wheel is also provided with a circular series of sliding stop pins 27, normally in the depressed position shown in Fig. 13, but adapted to be set up, as shown in Fig. 10, to engage a stop shoulder 6$^b$ (Fig. 10) and an arm 28 (Figs. 2, 3, 10 and 12). When one of said pins 27 engages shoulder 6$^b$ the rotation of the paper feed wheel 5 is perforce arrested, friction drive 22—23 permitting this, and arm 28 (which is somewhat springy) is sprung to one side. A plurality of arms 29, operated one or another by the finger keys, as hereinafter described, are provided for setting up the pins 27 into the engaging position, the distance of advance of the paper feed wheel being varied by operating one or another of these arms 29. Each pin 27 is surrounded by a spiral spring 30, which, however, serves merely as a friction device to hold the pin in any position to which it has been adjusted.

Arm 28 is a flexible and elastic member working between stop shoulders 6$^a$; and as shown in Fig. 12 particularly, pins 27 engage only the extreme end of said arm. When one of said pins engages said arm it springs it over toward the further stop shoulder 6$^a$, as shown particularly in Fig. 12. Arm 28 is arranged to be raised by a magnet 31. When the circuit of said magnet is completed and the arm 28 raised, said arm springs back over the top of the pin 27, said pin being held nevertheless by the shoulder 6$^b$ (Fig. 10). When the circuit of magnet 31 is broken and arm 28 is drawn down by spring 28$^a$ (Fig. 10) the pin 27 beneath said arm is depressed so as to pass under shoulder 6$^b$, the wheel 5 rotating until the next pin 27 which has been raised encounters arm 28 and stop 6$^b$. The effect of this is to feed forward the paper strip each time it is punched, a distance corresponding to the space occupied by the character punched.

33 designates the finger keys, and key-levers, which in general construction and manner of mounting are similar to the keys and key-levers of an ordinary typewriter. These key-levers operate selecting mechanism by which a particular combination of punches is caused to operate; said selecting mechanism comprising a series of pivoted bails 34 (Figs. 2, 6, 7, 17, and 20). Each key-lever carries a spring-actuated arm 35, (Fig. 6) carrying a friction roller 36 engaging one arm of a corresponding bell-crank 37, the other arm of which is directly opposite the bails 34; the construction being such that when a finger-key is depressed its corresponding bell-crank 37 will be actuated and will in turn actuate a corresponding combination of bails 34. These bails are cut out opposite certain of the bell-cranks 37 (see Fig. 20) so that each bell-crank, when operated, will operate a characteristic combination of the bails, leaving the others untouched. These bails, when operated, in turn permit the operation of a corresponding number of spring-pressed rods 38, suitably guided and which at their upper ends engage driving pins 39 of the punching mechanism; said pins 39 carried by the vibrating frame 10 above mentioned.

There is a separate pin 39 for each punch 8, located opposite, but with its end normally out of line with, the corresponding punch, and held in such position by a spring 40 (Fig. 9); so that so long as any one pin 39 is in its normal position it does not actuate its corresponding punch 8 when frame 10 moves forward; but if any one of the pins 39 is down during the forward motion of frame 10, it will actuate its corresponding punch 8, driving the same through the strip of paper (which strip passes through the slot between punch-frame 7 and front plate 9). Each rod 38 has a lug 41 by means of which, when said rod 38 is forced down, it carries with it the corresponding punch-actuating pin 39.

The rods 38 are mounted to slide vertically, and springs 42 (Figs. 6 and 17) tend to press them down; but normally each rod 38 is held up by a projection 43 (Figs. 17 and 20) engaging a collar 44 on the rod 38. When any one of the bails is moved out by a bell-crank 37, upon the depression of a finger key, the corresponding rod 38 is permitted to descend, carrying with it the corresponding punch actuating pin 39, and so causing the operation of the corresponding punch 8 on the next succeeding advance of the frame 10. The rods 38 which have been depressed are then reset by the cam 17. The same cam also actuates the punch-operating frame 10 by means of a spring-actuated lever 45 (Fig. 6) the upper end of which is adapted to engage a depending portion of the frame 10. Said frame is returned by a spring 46.

In Fig. 1, for the sake of clearness, I show only a few of the bell-cranks 37 and omit the rods 38 and associated parts. Shaft 15, upon which cam 17 is mounted, extends transversely across the machine. It is driven by the motor 11 through gears 12, 13 and 14 above mentioned, and a toothed clutch 47—48 (Figs. 2, 4, 5 and 7) which clutch is normally open, so that the shaft is normally stationary. A spring 49 tends to slide clutch member 48 on shaft 15 into engagement with clutch member 47, but normally this is prevented by a detent 50 (Figs. 3, 4 and 5) engaging a projection 51 of clutch member 48. This detent 50 is one arm of a pivoted bell crank, the other arm 52 of which is arranged to be actuated by a trip 53 pivotally connected to a bar 54, which is a universal bar extending transversely across the machine beneath the key levers 33 (see Fig. 6) and is mounted upon a support 55 pivoted at 56. A spring 57 normally holds universal bar 54 up into engagement with the key levers. When one of these key levers is depressed it depresses the universal bar 54 and in so doing depresses the trip 53. As shown particularly in Fig. 5, the rear face of this trip 53 is beveled; and against this face is the end of a set screw 58. As the trip is carried down it will be seen that screw 58, working against the beveled face of the trip, forces said trip outward, until finally the end of said trip is forced off the end of arm 52 of the clutch detent; but before this has happened, arm 50 of the clutch detent will have cleared projection 51 of clutch member 48, permitting said clutch member to slide into engagement with clutch member 47, under the impulse of spring 49, thus closing the clutch and causing shaft 15 to revolve. As soon as trip 53 has cleared the end of arm 52 of the bell crank, as just above described, the spring 59 of said bell crank returns the latter to normal position. Before one revolution of shaft 15 is completed the projection 51 of clutch member 48 encounters a resetting cam 60 (Figs. 2 and 4) arranged vertically, but at an oblique angle to the axis of the shaft 15, whereby clutch member 48 is forced backward and the clutch opened. As the projection 51 of clutch member 48 slips off from cam 60 it encounters a shoulder 61 of clutch detent arm 50, thus arresting abruptly the motion of shaft 15 and cam 16 in a normal position. To prevent rebound of the shaft I provide a spring catch 62 (shown in Figs. 7 and 8) arranged to engage a catch-cam 63 on shaft 15 as soon as said shaft has reached the normal position in which it is arrested by detent 50.

As soon as the particular finger key which was operated is released, it rises, being forced upward by the customary spring 64 and also by the spring 57 of the universal bar 54, and at the conclusion of the upward motion of such universal bar, the trip 53 slips over the end of the arm 52 of the bell crank, being actuated in this direction by the spring 65 (Fig. 4). The purpose of this trip 53 is to prevent the shaft 15 and cam 17 being rotated more than one revolution for a depression of a finger key, in case said finger key should be held down for a longer time than that required for shaft 15 to make one revolution. As will be seen, by the use of the trip 53, the universal bar is thrown out of engagement with the clutch detent as soon as said clutch is closed and the shaft 15 begins to operate, and said clutch will inevitably be opened again upon the completion of the one revolution of the shaft 15, and said clutch cannot be closed again until the universal bar has risen to, or substantially to, its normal position; and for it so to rise, the finger key which depressed it, must be released and must rise also. It will be seen therefore that the trip 53 and the clutch-opening cam 60 form a sure preventive of unwarranted duplication of a character.

The operation of clutch mechanism and punch mechanism is as follows: Upon the depression of any one of the finger keys, the corresponding bell crank 37 will be operated, in turn operating the corresponding characteristic combination of bails 34, thus releasing the rods 38 corresponding to such bails and causing said rods to draw down the corresponding punch-operating rods 39. At the same time the universal bar 54 is operated, causing the clutch 47—48 to be closed and the shaft 15 and cam 17 to be revolved through one revolution. Cam 17 then actuates lever 45, which lever drives forward the frame 10 carrying the rods 39, actuating the corresponding punches 8. As soon as the revolution of the cam 17 is completed, frame 10 is drawn back by its spring 46, the punches 8 which have been pushed forward are retracted by a spring actuated bar 66 (Fig. 2) which engages lugs 67 of all of these punches, the cam 17 also restores the rods 38, the punch operating pins 39 controlled thereby being raised by their springs 40 (Fig. 9). Before the depression of any one of the finger keys operated is quite complete, its roller 36 (Fig. 6) has slipped off the end of bell crank 37, thereby permitting the return of the bails 34; the projections 43 (Fig. 17) of these bails encountering the collars 44 of pins 38; and when as above described, the cam 17 raises the rods 38 to normal position, these projections 43 of the bails 34, slip under the collars 44, thus holding up the rods 38 in their normal position.

In Fig. 14 I show a paper tape perforated as it may be by my machine for the Wheatstone and similar systems of automatic telegraphy. According to the perforations commonly used in the Wheatstone system, two perforations, one above the other and in line, as shown at 68 Fig. 14, represent a dot of the telegraphic code, and two perforations one in advance of the other, as shown at 69 Fig. 14, represent a dash. Various of these dot and dash perforations making up the characters of the telegraphic code. Thus at 70, Fig. 14, I have illustrated one such character made up as follows: — ——— —. It will be obvious that instead of causing the punches to perforate the paper, I may cause them to emboss the paper. The mechanism in either case is substantially the same, and only the adjustment differs. If the punches are adjusted to go completely through the paper, they perforate; if they are adjusted merely to dent deeply the paper, they emboss. Even when, as in some systems of automatic and printing telegraphy, all of the telegraphic characters have the same number of pulses, the lengths of the various characters will differ according as the character consists of merely one dot, or one dash, or of various combinations of dots and dashes, or consists entirely of dots or entirely of dashes. It is necessary therefore to provide means for feeding the paper strip variable distances, and for feeding it, each time a key is depressed, a distance appropriate to the character of such key. For this purpose I employ the stop pins 27 on the feed wheel 5, and the arms 29 adapted to set up said stop pins; and I will now describe how said arms 29 and pins 27 are operated by the finger keys.

As shown in Fig. 11, the arms 29 are pivoted spring-actuated levers. At their outer ends they have pivoted to them depending arms 71 having springs 72 by which said arms are normally held in engagement with a stop 73; the arms 71 have projections 74 engaged by vertical rods 75 themselves engaged by bell cranks 76, arranged to be operated by tension wires 77 extending transversely across the machine over the finger keys; and each finger key is connected by a loop 78 to the particular tension wire 77 which, when pulled, will cause the paper to be fed a distance appropriate to the character of said key. (In Fig. 1 for the sake of clearness I show only a few of the loops 78). Supposing therefore, that one of the finger keys 33 be depressed and its corresponding tension wire 77 pulled, the bell crank 76 of that tension wire will pull down the rod 75, which in turn will move the arm 71 to the right (as viewed in Fig. 11) bringing the turned-over lower end of such arm 71 underneath a bar 79, mounted upon a pivoted carrier 80, and connected by a link 81 to a lever 82 arranged to be actuated by a cam 83 (shown in dotted lines in Figs. 3 and 6) which cam is on the shaft 15. As soon as shaft 15 begins to revolve, following the depression of the finger key, cam 83 will operate lever 82, causing bar 79 to carry down the particular arm 71 which has been moved into engagement with it and so raising the corresponding arm 29, causing it to push up the particular stop pin 27 directly above it.

When the universal bar 54 is operated as above described (as it will be when any one of the finger keys is depressed) it raises a contact spring 84 (Fig. 6) into contact with a contact point 85, closing a circuit 86 by which the magnet 31 of the restoring lever 28 of the paper feed mechanism is energized. Previous to the energization of said magnet 31, lever 28 was engaged and sprung over toward shoulder 6ª by that stop pin 27 which is now holding the feed wheel 5 stationary. When magnet 31 is energized, as just described, lever 28 rises and springs back over the top of such stop pin 27, in position to depress said pin into normal position. When the finger key just depressed is released and rises, the circuit of magnet 31 is broken, and lever 28, being drawn down by its spring 28ª, pushes down the pin 27 which has been arresting the feed wheel 5, thus permitting the wheel 5 to be driven by the friction drive 22—23 until arrested by the striking against stop 6ᵇ of that pin 27 which was raised by the depression of the character key just operated. It will be seen that when a character key is depressed (one of pins 27 being already raised and in engagement with stop 6ᵇ and wheel 5 being stationary) another of the stop pins 27 which is located the proper distance from stop 6ᵇ is raised, and upon the release of such finger key the first stop pin is depressed and wheel 5 permitted to rotate until said second pin 27 encounters stop 6ᵇ. In other words, after the punching of each character on the paper strip, the paper is fed forward a distance corresponding to the space on said strip occupied by such character.

The operation of my said perforating machine is therefore as follows: The motor 11 being in operation (the other parts of the machine will then be stationary) when one of the finger keys 33 is depressed, it will actuate its corresponding bell crank 37, which bell crank will in turn actuate the corresponding combination of bails 34, and these bails when actuated, will release the corresponding rods 38 permitting said rods to drop and pull down the corresponding punch actuating fingers 39. At the same time one of the tension wires 77 will be pulled, the corresponding spacing arm 29 will be raised and will raise the appropriate stop pin 27. At the same time universal bar 54 will be depressed, thereby actuating the clutch release 50 and causing clutch 47—48 to close, whereupon shaft 15 will be rotated and with it cam 17. At the same time the circuit of magnet 31 will be closed and arm 28 raised and caused to spring over the top of that stop 27 which is at the moment holding the paper feed wheel 5 stationary. Cam 17 in its rotation operates lever 45, thereby driving forward the vibrating frame 10 and so causing the punch actuating fingers 39, which have been depressed, to drive the corresponding punches 8 through the paper. These operations will occur exceedingly rapidly. It is easy to so adjust the contacts of the circuit of magnet 31 that said magnet cannot be deënergized no matter how early key 33 be released, until the punches have operated. But when magnet 31 is deënergized, the arm 28 is pulled down, depressing to normal position that stop pin 27 which has been holding the paper feed wheel, and permitting said wheel to rotate until that stop pin 27 which was raised upon the depression of the key 33 just released, arrests further rotation of said paper feed wheel 5. The cam 17 in its rotation restores the rods 38 and fingers 39 which have been depressed and the parts are then in position for another cycle of operations.

To facilitate the threading of the paper through the machine, I provide a key 87 (Figs. 1, 6, 18 and 19) by which the jaw clutch 24 in the drive mechanism of the paper feed wheel may be opened. This key, when it opens the clutch, also presses a stop pin 90 down into one of a series of holes 91 in the top 92 of spring case 22 (to which top 92 the spring 23 is secured) thereby preventing unwinding of the spring when the clutch is opened. To permit pin 90 to move laterally to accommodate itself to the holes 91, the opening in said key 87 through which pin 90 passes is large enough to permit lateral movement of said pin, a spring 93 normally holding said pin against one side of said opening. Pin 90 is guided by passing through an orifice in plate 5, as shown in Fig. 19. To carry away the punchings produced by the operation of the machine, I commonly provide in front of the die plate 9, a housing 88 (Fig. 1) to receive said punchings, and in connection therewith a pipe 89 which carries said punchings downward below the mechanism of the machine. I do not show this housing and pipe in the other views, for the sake of clearness.

I do not in this application claim broadly the mechanical connection to and operation of stop-setting devices by selecting mechanism operated by character members, or clutch-operating means comprising a detent and a trip therefor arranged to disengage said detent and permit immediate return of the latter, as these features are claimed in another application, Sr. No. 338,851.

What I claim is:—

1. A machine of the class described, comprising in combination a plurality of character members, feed mechanism comprising a movable carrier provided with stops, a power member, mechanical stop-setting means arranged to be engaged and operated by said power-member, and selecting means operated by said character members and arranged to select a particular stop-setting means and engage same with said power member.

2. A machine of the class described comprising in combination a plurality of character members, feed mechanism comprising a movable carrier provided with stops, a power member, mechanical stop setting means, and selecting means operated by said character members and controlling the operation of said stop-setting means, the latter deriving power from said power member.

3. A machine of the class described comprising in combination a plurality of character members, feed mechanism comprising a movable carrier provided with stops, selecting means operated by said character members, a power member, and power-operated stop-setting means deriving power for operation from said power member but controlled mechanically in operation by said selecting means.

4. A machine of the class described comprising in combination a plurality of character members, feed mechanism comprising a movable carrier provided with stops, a power member, a plurality of setting devices for said stops, provided with means for engaging said power member, and selecting means operated by said character members and controlling such engaging means of the stop-setting devices.

5. A machine of the class described comprising in combination a plurality of character members, feed mechanism comprising a movable carrier provided with stops, a reciprocating power member, a plurality of setting devices for said stops, provided with means for engaging said reciprocating member at will, and selecting means operated by said character member and controlling such engaging means.

6. A machine of the class described comprising in combination a plurality of character members, feed mechanism comprising a movable carrier provided with stops, a reciprocating power member, a plurality of setting devices for said stops, provided with latches for engaging said power member, and selecting means operated by said character members and controlling such latches.

7. A machine of the class described comprising in combination a plurality of character members, feed mechanism comprising a movable carrier provided with stops, a power member, a plurality of setting devices for said stops, provided with means for engaging said power member, and selecting means mechanically operated by the several character members and mechanically connected to said engaging means and arranged when operated to bring same into engagement with said power member.

8. A machine of the class described comprising in combination a plurality of character members, feed mechanism comprising a movable carrier provided with stops, a power member, means controlled by said character members for operating the same, selecting means, and stop-setting means arranged to be operated by said power member and controlled by such selecting means.

9. A machine of the class described comprising in combination a plurality of character members, feed mechanism comprising a movable carrier provided with stops, a power member, a clutch controlled by said character members for driving the same, and stop-setting means arranged to be operated by said power member and controlled by said selecting means.

10. A machine of the class described comprising in combination a plurality of character members, feed mechanism comprising a movable carrier provided with stops, a power member, pivoted stop-setting arms, latches carried thereby adapted to engage said power member but normally out of such engagement, and selecting means mechanically operated by said character members and in mechanical operative engagement with said latches for operating the latter.

11. A machine of the class described comprising in combination a plurality of character members, feed mechanism comprising a movable carrier provided with stops, a power member, stop-setting means, latches carried thereby adapted to engage said power member but normally out of such engagement, and a plurality of selecting members each mechanically engaging one of said latches and arranged to be engaged mechanically by one or more of said character members.

12. A machine of the class described comprising in combination a plurality of character members, feed mechanism comprising a movable carrier provided with stops, a power member, stop-setting means, means for operating same arranged to be operated by said power member, and selecting means operated by said character members arranged to select such operating means and engage same with said power member.

13. A machine of the class described comprising in combination a plurality of character members, feed mechanism comprising a movable carrier provided with stops, a power member, stop-setting means, means for operating same arranged to be operated by said power member, and selecting means comprising a plurality of tension members operatively connected to corresponding operating means and arranged to be operated by corresponding character members.

14. A machine of the class described comprising in combination a plurality of character members, punching mechanism comprising a plurality of punches, a vibrating carriage, means for vibrating the same comprising a clutch controlled by said character members, punch-operating fingers pivotally mounted in said carriage, and means for moving said fingers into and out of operative position with respect to their corresponding punches, comprising selecting means operated by said character members.

15. The combination with a plurality of character levers, of punching mechanism, selecting and actuating mechanism therefor comprising cam mechanism and means for driving the same controlled by said levers and comprising automatic disconnecting means, and a rebound catch arranged to engage a driven portion of such cam mechanism, beyond said disconnecting means, and prevent rebound thereof after disconnection.

16. The combination with a plurality of character levers, of punching mechanism, selecting and actuating mechanism therefor comprising a rotary cam and driving means therefor controlled by said levers and comprising a clutch and automatic means for opening the same, and a rebound catch for said cam.

17. The combination with a plurality of character-selecting devices, of punching mechanism, and means for controlling and operating the same including selecting mechanism and means operated by each character-selecting device for operating said selecting mechanism comprising automatic disconnecting means interposed between said selecting mechanism and character-selecting means arranged to disconnect same upon operation of the character-selecting devices to the full extent.

18. The combination with a plurality of character-selecting devices, of punching mechanism comprising a plurality of punches, means for actuating the same comprising pivoted selecting members, actuating arms therefor, and means for connecting each character-selecting device to the corresponding actuating arm comprising automatic disconnecting means.

19. The combination with a plurality of character-selecting levers, of punching mechanism comprising a plurality of punches, means for controlling the same comprising pivoted slotted members, actuating arms therefor, controlled by said levers and automatic disconnecting means interposed between said character-selecting levers and actuating arms.

20. The combination with a plurality of character-selecting levers, of punching mechanism comprising a plurality of punches, means for controlling the same including spring-actuated members, pivoted slotted members normally locking said spring-actuated members, and means for actuating one or another of said slotted members, actuated by said levers.

21. The combination with a plurality of character-selecting levers, of punching mechanism comprising a plurality of punches, corresponding punch-operating fingers, means therefor comprising spring-actuated members, pivoted slotted members normally locking said spring-actuated members, and means for actuating one or another of said slotted members, actuated by said levers.

22. The combination with a plurality of character-selecting levers, of punching mechanism comprising a plurality of punches, corresponding punch-operating fingers, means for driving the same, selecting means therefor comprising spring-actuated members, pivoted slotted members normally locking said spring-actuated members, means for actuating one or another of said slotted members, actuated by said levers, and restoring means for said spring-actuated members.

23. The combination with a plurality of character-selecting levers, of punching mechanism comprising a plurality of punches, corresponding punch-operating fingers, means for driving the same, selecting means therefor comprising spring-actuated members, pivoted slotted members normally locking said spring-actuated members, means for actuating one or another of said slotted members, actuated by said levers, restoring means for said spring actuated members, and automatic disconnecting means interposed between said character-selecting levers and said slotted members.

24. The combination with a plurality of character-selecting levers, of punching mechanism comprising a plurality of punches, selecting and actuating mechanism therefor comprising punch-actuating fingers, a vibrating carriage therefor, selecting bails and means actuated thereby for actuating said fingers, and means actuated by said levers for actuating said bails comprising automatic disconnecting means.

25. The combination with a plurality of character-selecting levers, of punching mechanism comprising a plurality of punches, selecting and actuating mechanism therefor comprising punch-actuating fingers, means for vibrating the same, selecting bars, means actuated thereby for actuating said fingers, and actuating members for said bars, and catches for said actuating members operated by said character-selecting levers and arranged to engage said actuating members to actuate same and then to disengage therefrom.

26. The combination with a plurality of character-selecting levers, of punching mechanism comprising a plurality of punches, selecting and actuating mechanism therefor comprising punch-actuating fingers, means for vibrating the same, selecting bars, means actuated thereby for actuating said fingers, and pivoted levers for actuating said bars, and catches for said pivoted levers carried by and operated by said character-selecting levers and arranged to engage said pivoted levers to operate same and then to slip off therefrom.

In testimony whereof I affix my signature, in the presence of two witnesses.

JOHN C. BARCLAY.

Witnesses:
H. M. MARBLE,
C. A. VAN BRUNT.